April 21, 1970 R. P. CROWLEY ET AL 3,507,097
GAS FRACTIONATING APPARATUS
Original Filed April 9, 1964 6 Sheets-Sheet 1

INVENTORS
RICHARD P. CROWLEY
VICTOR T. TAKATA
EDMUND L. PESSA

INVENTORS
RICHARD P. CROWLEY
VICTOR T. TAKATA
EDMUND L. PESSA

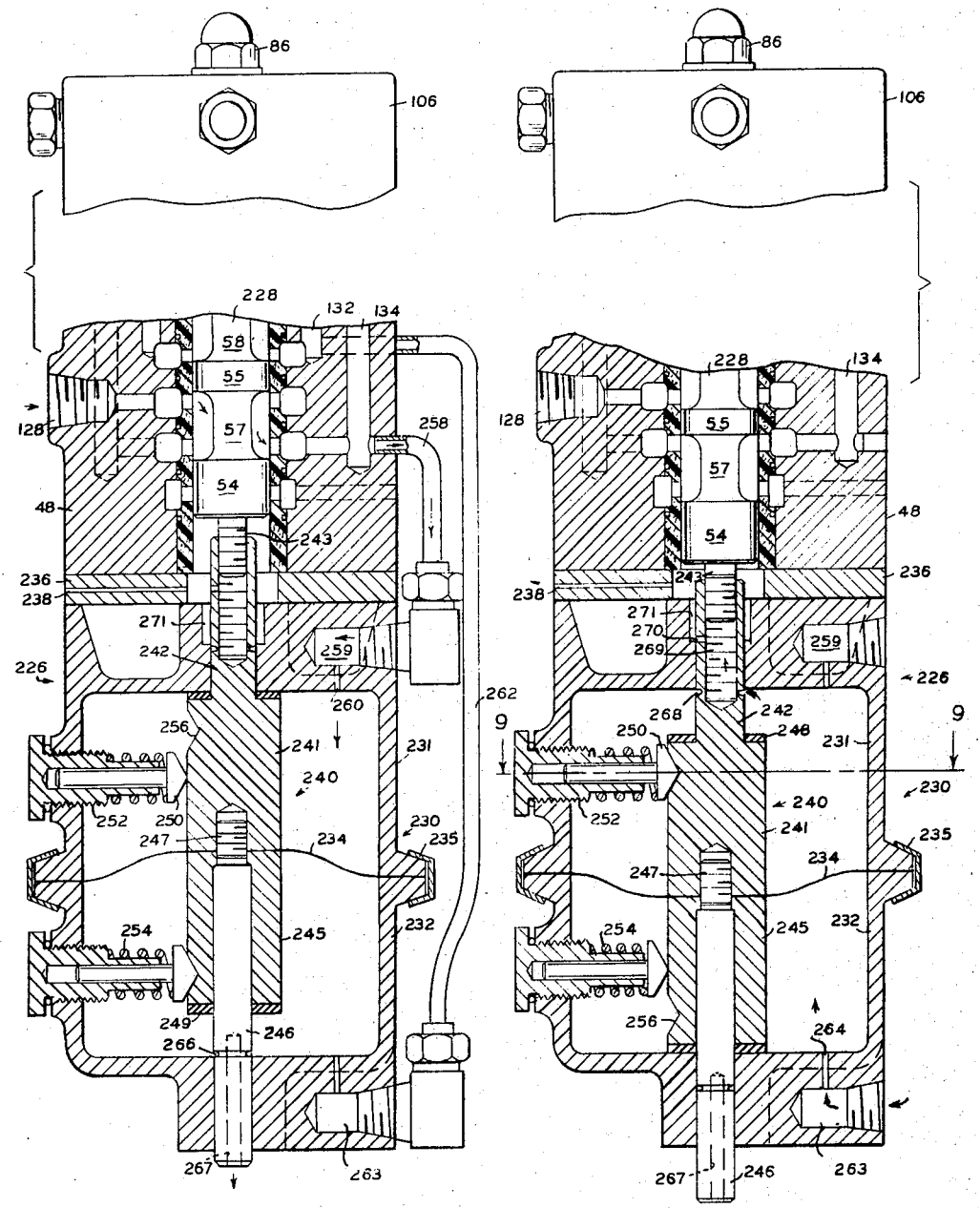

INVENTORS
RICHARD P. CROWLEY
VICTOR T. TAKATA
EDMUND L. PESSA

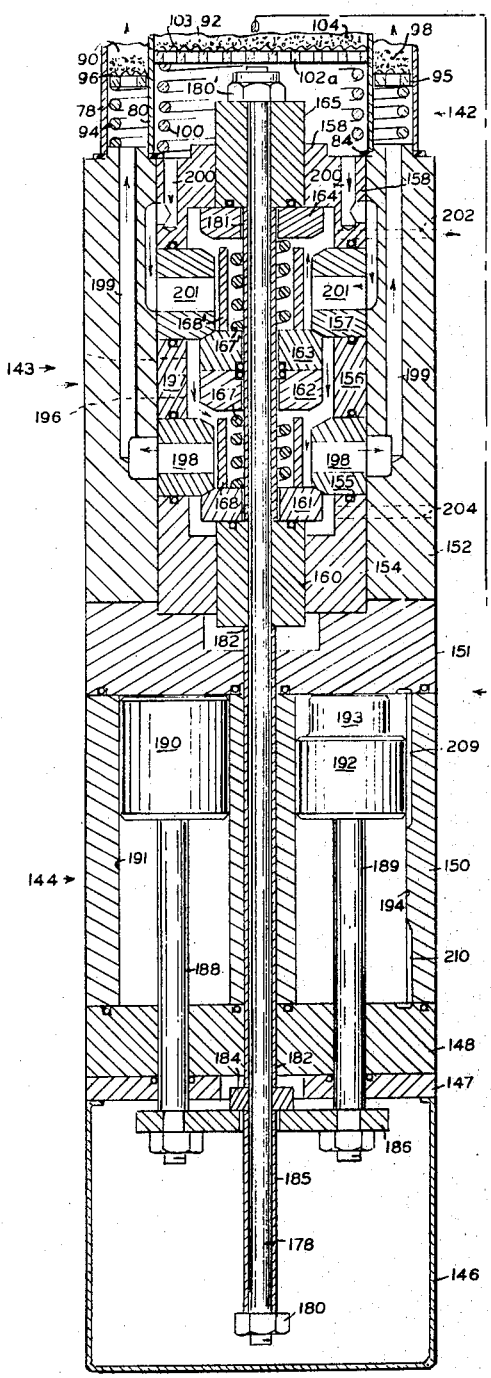
FIG. 10
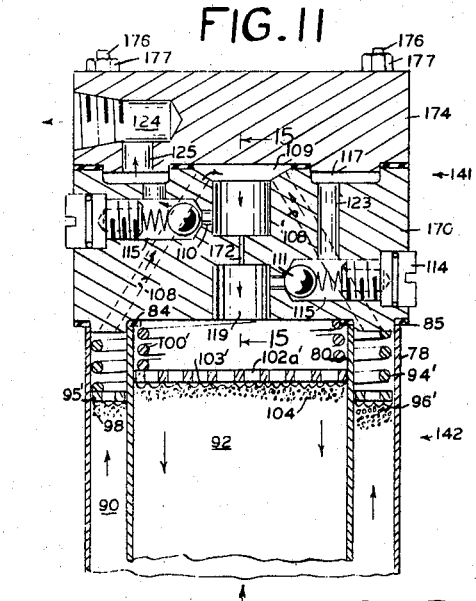
FIG. 11
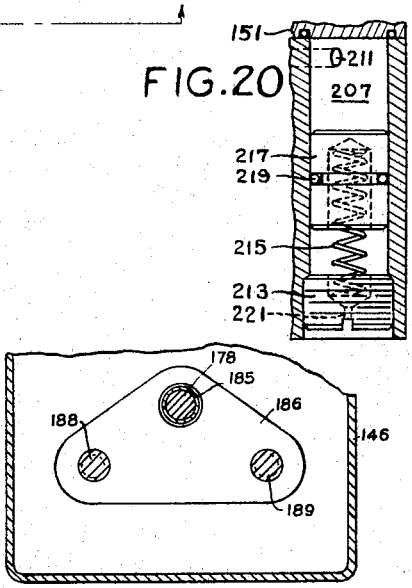
FIG. 20
FIG. 19
INVENTORS
RICHARD P. CROWLEY
VICTOR T. TAKATA
EDMUND L. PESSA

INVENTORS
RICHARD P. CROWLEY
VICTOR T. TAKATA
EDMUND L. PESSA

United States Patent Office 3,507,097
Patented Apr. 21, 1970

3,507,097
GAS FRACTIONATING APPARATUS
Richard P. Crowley, Milton, Victor T. Takata, Cambridge, and Edmund L. Pessa, Arlington, Mass., assignors to Abcor, Inc., Waltham, Mass., a corporation of Delaware
Original application Apr. 9, 1964, Ser. No. 358,480, now Patent No. 3,365,861. Divided and this application Jan. 23, 1968, Ser. No. 718,962
Int. Cl. B01d 53/04
U.S. Cl. 55—162                    9 Claims

ABSTRACT OF THE DISCLOSURE

Gaseous fractionating apparatus having a first and second zone in heat exchange relationship. A single valve means permits the alternate introduction of gas into each zone. A pneumatic activator and hydraulic timer move the valve in a predetermined timed sequence.

---

This is a divisional application of Ser. No. 358,480, filed Apr. 9, 1964, entitled Gas Fractionating Apparatus, now U.S. Patent No. 3,365,861.

Our invention relates to an apparatus and method for fractionating gaseous mixtures. In particular our invention concerns an apparatus and method for removing one or more key components such as moisture from a gaseous stream such as air.

Even more particularly this invention pertains to fractionating apparatus arranged in a unitary assemblage and in which there is provided a timing means, a valve switching section responsive to said timing means and adapted to receive a gross influent pressurized stream of gas and in alteration feed said stream to one of two adsorbent beds operative in heat exchange relationship to each other, whereby the gross gaseous stream not selectively adsorbed by the bed is fed to a discharge section, and a portion of this stream is fed to the other adsorbent bed so as to purge this bed of the selectively adsorbed or key component and to cause this reflux gaseous stream to be discharged from the system.

In the conventional method of fractionating gaseous mixtures by alternating and cyclic adsorption and desorption at relatively high and low pressures a feed stream comprising a mixture of gaseous components and containing one or more key components is introduced cyclically and in rapidly alternating sequence at a relatively high pressure into one end of each of one or more fixed bed fractionating zones. These zones contain a bed of adsorbent material having a primary selective affinity for at least one key component of the gaseous mixture feed stream. The key component may be regarded as a contaminant or impurity such as moisture, oil vapor, vaporous chemical degradation products, etc., or may be a component which is desired to be recovered or separated such as oxygen, nitrogen, the rare gases, helium, gas isotopes, etc. During the passage of the original gaseous feed stream through one zone, the entire adsorbent bed thereof is maintained under substantially the relatively high pressure of the original feed stream. After passage through this zone, those gaseous components which have not been selectively adsorbed are discharged as the gross primary output stream at the opposite or other end of the fractionating zone at substantially the original feed stream pressure.

At essentially the same time and usually prior to complete adsorptive saturation of the relatively high pressure zone, the adsorbent bed of one or more of the other fractionating zones previously on the relatively high pressure adsorption cycle is depressurized or placed on the desorption cycle by opening one end of the zone to a region of relatively low pressure such as the atmosphere. At substantially the same time that the pressure on this zone is reduced, a stream portion may be withdrawn from the gross primary output stream discharged from the high pressure adsorption zone, and introduced as a gas reflux stream into the opposite or other end of the reduced pressure zone to pass over and through the body of the adsorbent material therein. The remaining net primary output stream is recovered at the other end of the high pressure zone for the purposes desired. Intermediate the two zones, the withdrawn gaseous reflux stream is passed through a pressure reducing device such as a regulating valve or an orifice. The flow of the withdrawn, relatively low pressure gaseous reflux stream through the zone on the desorption cycle is effected in countercurrent relationship to the flow of gas through this same zone on its previous adsorption cycle, yielding at the one end of the low pressure zone a gross gaseous secondary output stream comprising the reflux portion of the gross primary input stream and the gaseous components previously adsorbed at the relatively high pressure, and now desorbed from the adsorbent bed at the relatively low pressure, and which contains the key component in an increased concentration over the original gaseous feed stream.

In this manner the concentration point of moisture or other key component in each zone is maintained between upper and lower predetermined limits although oscillating between these limits, and where the feed stream is air containing moisture vapor, a continuous net primary output stream of dry air is obtained.

Conventional apparatus required for this described operation, as exemplified in the U.S. Patent No. 2,944,627, issued July 12, 1960, to C. W. Skarstrom, and particularly for the removal of moisture from an air feed stream, is often bulky and unduly complex and thus limited under those conditions where economy of space and reliability of operation are primary factors. Additionally, to produce a continuous net primary output stream conventional apparatus employs two or more separate adsorption zones complete with separate valves and interconnecting conduits in a base element. This type of apparatus is more expensive, occupies more space, and diminishes operational reliability by the need for additional valves, adsorbent zones, and conduits. Further, where there exists a great disparity between the heats of adsorption and desorption of the gaseous mixture and moisture is present in the mixture, ice may be formed in a zone on the desorption cycle. This ice may be difficult to remove on the adsorption cycle due to lack of proper heat transfer within the adsorbent packed zones, and if continued will result in operational malfunctioning of the apparatus. Thus conventional apparatus to continually recover one component of a gaseous mixture is generally wasteful of space with the adsorbent zones occupying relatively little of the total volume of the apparatus, more expensive, subject to operational malfunctioning, and a greater degree of unreliability.

It is therefore an object of our invention to provide a compact gas fractionating apparatus of high operational reliability.

Another object of our invention is to provide a relatively inexpensive gas fractionating apparatus of simplified construction which apparatus will provide a continuous net primary output stream.

Another object of our invention is to provide a gas fractionating apparatus in which the adsorption zones are in a heat exchange relationship.

A further object of our invention is to provide a compact, inexpensive, air dryer apparatus of simplified construction.

It is a further object of our invention to provide a gas fractionating apparatus wherein the cycling operation may be timed and motivated by electrical power.

It is a further object of our invention to provide a gas fractionating apparatus wherein the cycling operation may be timed and operated by pneumatic apparatus fed by the gross primary influent pressurized gas stream.

It is a further object of our invention to provide a gas fractionating apparatus wherein the cycling operation may be motivated by pneumatic means fed by the gross primary influent pressurized gas stream and by means of a hydraulic fluid control to time the cycling operation.

It is still a further object to provide an improved method of gas fractionation whereby the adsorption zones are maintained in heat exchange relationship so as to include among others the steps of cooling the adsorbent bed on the high pressure adsorption cycle by heat exchange with the adsorbent bed on the low pressure desorption cycle and the simultaneous step of warming the adsorbent bed on the low pressure desorption cycle by heat exchange with the adsorbent bed on the high pressure adsorption cycle.

Further objects and advantages of our invention will be apparent to those skilled in the art from the following detailed description of our invention taken with the accompanying drawings wherein:

FIG. 7 is a somewhat diagrammatic sectional view showing apparatus similar to that of FIGS. 1–4 but with a pneumatic actuating and control means instead of an electrical means and the flow control means at one limit of operation;

FIG. 8 is a view similar to FIG. 7 but with the penumatic and the flow control means at the other limit of operation;

FIG. 10 is a somewhat diagrammatic sectional view showing the lower portion of apparatus similar to that of FIGS. 1–4 but with a pneumatic-hydraulic actuating and timing control means instead of the electrical actuating and flow control means of FIGS. 1–4 and at one limit of operation;

FIG. 11 is a somewhat diagrammatic sectional view showing the upper portion of the apparatus of FIG. 10;

FIG. 19 is a sectional view taken on the line 19–19 of FIG. 12.

Figure 1:
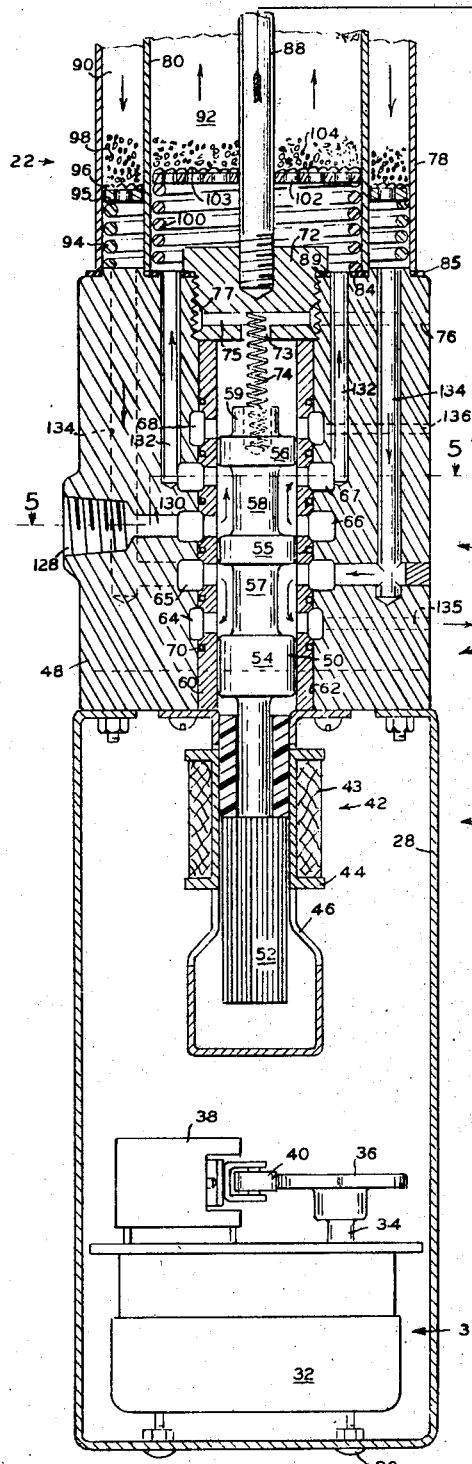
FIG. 1 is a somewhat diagrammatic sectional view of the lower portion of a preferred embodiment of our apparatus and showing an electrical actuating and control means holding the flow control means in one limit of operation.
Figure 2:
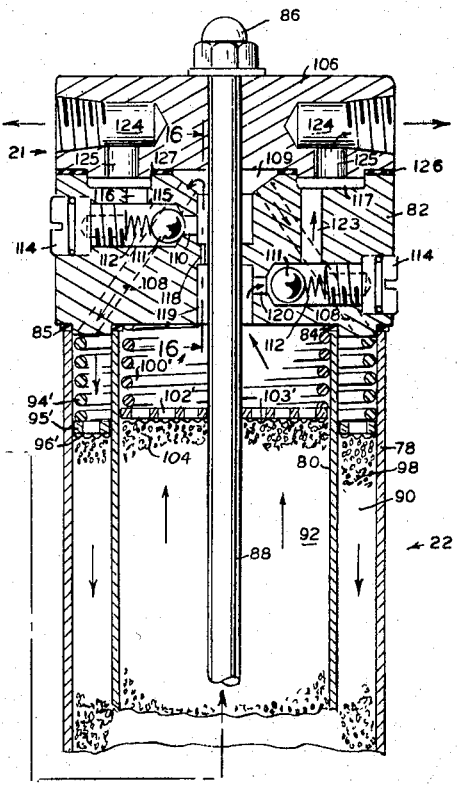
FIG. 2 is a somewhat diagrammatic sectional view showing the remaining upper portion of the embodiment of FIG. 1.
Figure 3:
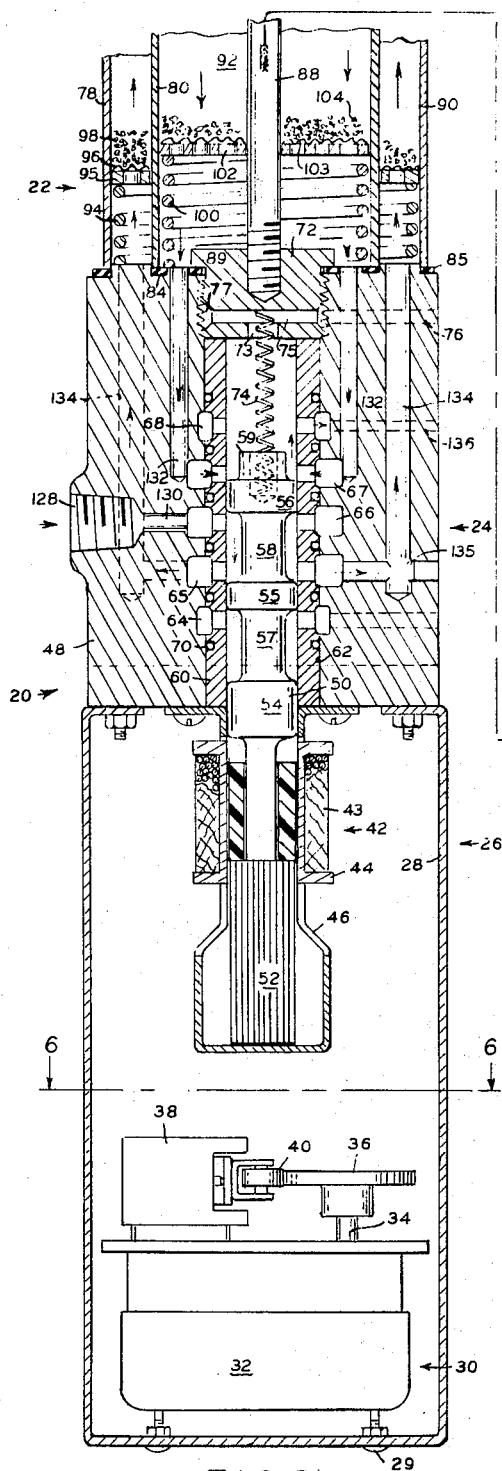
FIG. 3 is a view similar to FIG. 1 but with the electrical actuating means de-energized and the flow control means at the other limit of operation.
Figure 4:
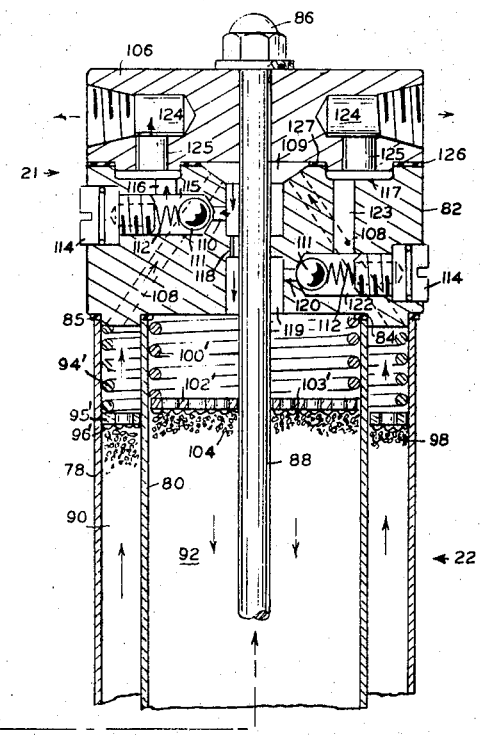
FIG. 4 is a view similar to FIG. 2 but with the flow of the stream on the alternate cycle of operation.
Figure 6:
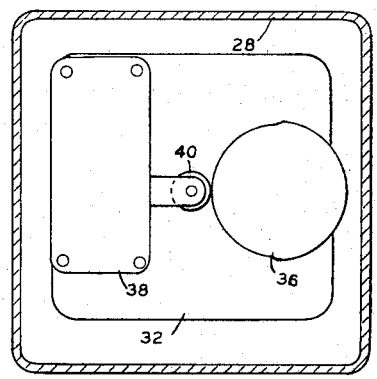
FIG. 6 is a sectional view taken on the line 6—6 of FIG. 3.

Referring now to the drawings in detail, FIGS. 1, 2, 3 and 4 show, partly diagrammatically and mostly in section, a preferred embodiment of our invention in which the gas fractionating apparatus is actuated by an electrical solenoid whose operational timing sequence is selectively and adjustably controllable by means of an electrical timing device. In these FIGS. 1–4 are shown this embodiment in two positions of operation. FIGS. 1 and 2 show the apparatus arranged so that the pressurized gross primary influent stream is passed through the inner adsorbent and thereby fractionated while the outer adsorbent bed is being purged on the reflux or desorption cycle. FIGS. 3 and 4 show the same apparatus arranged in the alternate cycle wherein the outer adsorbent bed is arranged to receive the pressurized gross primary influent stream as it is passed through the outer adsorbent bed and fractionated and the inner adsorbent bed is being purged on the reflux cycle.

In this embodiment there is shown a unitary assembly 20 in which there are four primary sections, each providing a complete unitary function interrelated with the other sections. As shown, the top section is the output recovery section 21. Immediately below is the adsorbent bed section 22 which includes an inner and an outer adsorbent bed in heat exchange relationship. The beds will be more fully described below. The next lower section is the flow-switching section 24 which includes the valve components and passageways which control the flow of the streams of gas which will be described in detail below. The actuating or lower section 26 includes the solenoid and timer components which provide the actuation to move the valve to the various desired positions in the switching section 24.

The lower or actuating section 26 is shown as housed within a protective cover 28 which may be drawn or fabricated of sheet metal. Supported on and attached by bolts 29 to the lower end of cover 28 is an electrical timer 30 which may be a commercially available timer, such as "Industrial 1–SW" made by Industrial Timer Corp., U.S. Highway 287, Parsippany, N.J. This type of a timer conventionally made up of an electical motor 32 having, as mounted, an upwardly directed rotating shaft 34, carrying a cam 36. This case as it is rotated actuates in a predetermined cycle such as 5 seconds to 5-minute intervals; e.g. 30 seconds, a mounted microswitch 38 through a plunger-carried roller 40. The microswitch 38 or other electrical or timed actuating means communicates with an electrical solenoid 42 having a coil 43 mounted within a laminated core 44, carried by a mounting bracket 46 which at its bottom or closed end serves also as a stop for the movement of spool valve components to be later described. The other end of the bracket 46 is secured by screw of other fastening means through appropriate holes in said bracket to the base of the flow-switching section 24.

The flow-switching section 24 comprises a main housing block 48 having a central passageway therethrough, said passageway having provision for carrying in slidable relationship thereto a spool 50 forming the flow directing portion of a four-way spool valve arrangement. The lower end of spool 50 is attached to a magnetic plunger 52 slidably movable in core 44 of the solenoid 42. The spool 50 as exemplified, has three major diameter portions 54, 55 and 56, with two lesser diameter portions 57 and 58. Portion 57 is intermediate diameters 54 and 55, while lesser diameter portion 58 is intermediate major diameters 55 and 56. A top reduced portion 59 extends from major diameter 56 to the upper end of spool 50.

To provide our apparatus with components not only susceptible of economics in multiple production of original manufacture, but also easy repair or replacement, we provide a spool-carrying sleeve or liner 60 which may be made of metal or long-wearing plastic, such as nylon or Teflon. This liner, as seen in FIGS. 1 and 3, has a plurality of external grooves or channels, each having one or more transversely drilled holes running from the groove to the internal cylindrical passageway. This internal passageway of liner 60 is formed so as to provide a sliding fit with spool 50 and in so doing to contact the major spool diameters in a nearly gas-tight engagement. The external cylindrical surface of liner 60 is made to slide or be lightly pressed into a correspondingly formed internal cylindrical bore in housing block 48, the line of engagement being designated 62. The external grooves on the liner 60 are selectively made so as to coincide with internally formed circumferential grooves in the passageway of block 48 so that the two correspondingly facing grooves form a gas-transporting circular passageway, the plane of which is generally at right angles to the axis of the spool 50. As seen in FIGS. 1 and 3, the groove-formed circumferential gas passageways are identified as follows: a lowest gas passageway 64, next-lowest gas passageway 65, central passageway 66, next-to-top passageway 67, and top passageway 68. Adjacent each passageway there is formed in the liner 60 an O-ring groove in which an O-ring 70 is typically mounted, said O-ring being of a resilient material such as rubber and, if of rubber, selected from such commercial rubber compounds as are resistant or impervious to attack by the class of gas or gases being fractionated. As seen in FIGS. 1 and 3, there are six O-rings 70, each acting as a sealing means for preventing gas from one of the passageways 64–68 from escaping to an adjacent passageway.

The upper end of the passageway through housing block 48 has formed therein a threaded recess in which a plug 72 is mounted. The lower face of this plug engages liner 60, and as it is screwed into block 48 this lower face urges the other end of this liner into contact with the cover 28. A recess 73 in the lower face of the plug 72 receives and retains the upper end of a compression spring 74 while the lower end of this spring is mounted in a recess in the upper end of spool 50. Intermediate the lower and upper portion of the threaded portion of plug 72, there is formed a circumferential recess 77 and from a point diametrically opposite and through spring recess 73 there is drilled a gas passageway 75. A relief gas passageway 76 is provided in the housing block 48 and provides means for the discharge to the outside of assembly 20 of any gas passing by the major spool diameter. In the upper face of plug 72 there is formed a threaded hole which receives and retains a stud to be later described.

The absorbent section shown in FIGS. 1–4, and as reduced to practice, includes an outer cylindrical wall 78 and a common intermediate wall 80, both preferably made of seamless metal tubing. The lower ends of walls 78 and 80 rest on housing block 48 and are aligned and spaced by shoulders formed in the upper face of the block. The upper ends of the walls 78 and 80 abut and support the header block 82 which contains a large portion of the output recovery section 21. Similarly formed and spaced shoulders formed in the lower face of header block 82 maintain the block and walls in a preselected spaced arrangement.

The chambers formed by the walls and housing block 48 and header block 82 are made gas- and pressure-tight by means of gaskets 84 and 85 which may be made of high density rubber, and which are compressed when a nut 86 mounted on the upper or external end of a stud 88 is tightened on said stud. The other end of this stud is screwed into the threaded hole of plug 72. Plug 72 is sealed in housing block 48 by means of a gasket 89 which may also be of high density rubber and which is compressed between an upper shoulder of the seated and tightened plug 72 and the upper face of the housing block 48.

The external chamber 90 formed by tubular shaped walls 78 and 80 and blocks 48 and 82 is, as exemplified, cylindrical in cross-section and of a predetermined length. An internal chamber 92, whose outer wall 80 also forms the inner wall of the external chamber 90, is in effect cylindrical in cross-section, since the stud 88 extends centrally through this inner chamber 92. In the present instance it is to be pointed out that the cross-sectional area of the external chamber 90 is equal to the cross-sectional area of the external chamber 90 is equal to the cross-sectional area of the inner chamber 92.

In both ends of the external chamber 90, there are compression springs 94, and 94', each spring having one end thereof bearing against block 48 or 82 and having the inner or other end of the spring bearing against and urging toward each other a perforated retaining plate 95 or 95'. Lying on the opposite or facing sides of retaining plates 95 and 95' are filters 96 and 96' which may be plastic or felt and which provide means to prevent the passage therethrough of small particles or dust from the bed of adsorbent material 98. The springs 94 and 94' urging retaining plates 95 and 95' and the filters 96 and 96' thereon toward one another enable the bed of adsorbent material 98 disposed between to be firmly supported and maintained in its early original assembled relationship, particularly during the cycle reversals when the flow of a gas stream through the bed is a high-velocity blast of pressurized air and the reverse purging flow is a low pressure flow. The thrust on the bed particles caused by the blast of in-rushing pressurized gas and the attrition and powdering that would be caused if the adsorbent particles were not firmly contained and restrained during these pressure fluctuations is nearly eliminated by the biased pressure on the particles caused by the springs 94 and 94'.

The inner chamber 92 is constructed similar to chamber 90 in that the inner chamber has a pair of compression springs 100 and 100'. The outer end of the lower spring 100 rests on housing block 48, and the outer end of the upper spring 100' engages header block 82. Engaging and being urged toward each other by springs 100 and 100' are perforated retaining plates 102 and 102'. Also lying on these plates 102 and 102' are filters 103 and 103' of similar construction and purpose as filters 96 and 96' and which serve to prevent passage from the chamber 92 of any dust or small particles from the adsorbent material 104 lying between the plates 102 and 102' and forming an adsorbent bed therebetween.

The output recovery section 21 is housed in the header block 82 and a head plate 106 which lies immediately above it. In block 82 there are one or more upwardly and inwardly directed gas passages 108 extending from the upper end of chamber 90 to a recess 109 formed in the central upper portion of block 82 and extending from the upper surface thereof to a point nearly midway of the block 82. From this recess a gas passage 110 extends to a ball seat in which a ball check 111 is urged into place by a check spring 112. The outer end of the spring 112 is held in place by a spring back-up screw plug 114 threaded into a ball check chamber 115 formed in housing 82. From the ball check chamber 115 which houses the ball and spring, there is a gas passageway 116 extending upwardly to a collector annular recess 117 formed in the face of housing block 82.

From the bottom face of recess 109 there extends a restrictive passage 118 which may be about .05 inch in diameter and which acts as a metering orifice for the passage threthrough of a reflux stream of gas. The passage 118 terminates at recess 119 which is open to the top of internal chamber 92. From recess 119 a gas passage 120 extends to a ball check seat in ball check chamber 122 within which a ball check 111, check spring 112 and spring back-up screw plug 114 are housed and mounted in a manner similar to the ones mounted in ball check chamber 115. From ball check chamber 122 a gas passage 123 extends to the collector recess 117.

In head plate 106 there are formed two oppositely disposed pipe-tapped outlet ports 124, each connected by gas passageways 125 to the collector recess in header block 82. Gaskets 126 and 127 between block 82 and plate 106 provide gas-tight sealing of collector recess 117 and recess 109.

OPERATION

As shown in FIGS. 1 and 2, the solenoid 42 is in operative position in that cam 36 has caused microswitch 38 to close, causing an electric current to flow to the solenoid to energize and pull magnetic plunger 52 upwardly and thereby moving spool 50 to the position shown while at the same time compressing the spring 74. From an inlet port 128 formed in the side of block 48, a pressurized influent stream of gas to be fractionated is fed by passageway 130 to collector passageway 66 and through the inwardly drilled holes to the passageway around the lesser spool diameter 58. From passageway 58 the gas travels outwardly through the drilled holes to the next-to-top passageway 67. One or more upward gas passageways 132 carries the pressurized influent stream upward to the open underside of internal chamber 92 whence the gas passes through the holes in the perforated plate 102 and then through filter 103 and into the adsorbent bed in chamber 92. The holes in the perforated plate 102 and the gas passageways in filter 103 are of sufficient size and quantity to permit the passage therethrough of the pressurized gross influent stream, virtually without a reduction in pressure.

The adsorbent material 104 in chamber 92 is of at least granular size and as placed in the chamber 92 provides therethrough a multiplicity of passageways for the flow of the gas stream over and around the adsorbent material so that that component of gas for which the adsorbent material has a selective affinity may be adsorbed. At the upper end of the chamber, the stream having passed the length of the bed and having deposited the undesired portion of the gas in the adsorbent bed, becomes the gross effluent stream of gas. This gross stream still under high pressure passes through filter 103' and then through openings in the perforated plate 102' and into the open top of inner chamber 92. This pressurized stream now enters recess 119 then gas passage 120, where the pressure of the gas urges ball check 111 from the seat and into ball check chamber 122 while compressing check spring 112. This prssurized primary effluent stream passes up passageway 123 and into collector recess 117 whence it passes through either of the passageways 125 and out ports 124 for use in the desired condition and in other apparatus (not shown).

The reflux stream used to purge the adsorbent bed and as shown in FIGS. 1 and 2 is derived from a portion of the gross stream entering recess 119. Through restrictive passage 118 a small predetermined portion of the gross effluent stream enters recess 109 and, upon entering this recess, expands and drops its pressure to the pressure in the recess 109, which at this instant is probably about 10–15 p.s.i.g. As the pressure in the recess 109 is less than the force exerted by the check spring 112 on ball check 111 in ball check chamber 115, this secondary stream enters gas passageway 108 and flows to the open top of external chamber 90. The adsorbent material 98 having just completed an adsorbing cycle is now to be purged on this reflux cycle, hence this secondary stream is fed through the openings in the perforated retaining plate 95' and filter 96' and then into and through the adsorbent bed of chamber 90.

Utilizing the physical law of gases, in which common gases when expanded through sudden pressure drops simultaneously lower their temperature, this secondary reflux stream having been expanded as it was discharged from the restrictive passage 118 into recess 109, the resulting cooler gas is now fed through the adsorbent material 98 where it cools and purges the material as said gas passes over and around the adsorbent material 98.

The reflux stream now saturated with the constituent removed from the gross influent stream now passes through the lower filter 96, perforated retaining plate 95, and into the open lower portion of external chamber 90. From this portion of chamber 90 the reflux stream is carried by one or more gas passageways 134 to central collector passageway 65, thence through drilled holes into the lower lesser spool diameter 57, thence through the drilled holes to the lowest collector passageway 64 and from this passageway through transverse gas passageway 135 to the outer surface of block 48 whence it is discharged to the atmosphere, or if of commercial value, is piped to an exterior receiving vessel not shown.

Figure 5:
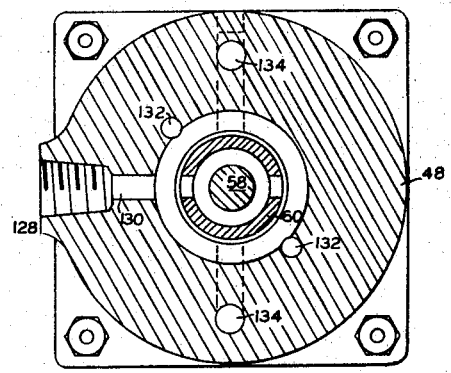
FIG. 5 is a sectional view taken on the line 5—5 of FIG. 1.

It is to be noted as illustrated in FIG. 5 that the orientation of longitudinal gas passageways 132 and 134 is not critical, and that they may be randomly spaced in any desired pattern. It is only necessary that passageways 132 be between plug 72 and gasket 84 and that passageway 134 be drilled in the shoulder section between walls 78 and 80. The location of passageway 76 and inlet port 128 and passageway 130 is to be noted in the drilling of passageways 132 and 134.

In FIGS. 3 and 4 the moving components of the apparatus of FIGS. 1 and 2 are at the other extent of movement and the adsorption and desorption cycles are now reversed. The bed in the external chamber 90 is on the pressurized adsorption cycle, and the internal chamber 92 is on the reflux or desorption cycle. The cam 36 of timer 30 has rotated so that roller 40 of microswitch 38 has moved its contacts to a disconnected or open position, and thus solenoid 42 is deenergized and no longer holds magnetic plunger 52 in the upward position. Spring 74 has expanded and moved spool 50 to the down position as controlled by the downward travel of plunger 52 which is stopped by the lower transverse bar portion of mounting bracket 46. In this position as indicated in FIGS. 3 and 4 the spool 50 redirects the flow of the gross influent stream as well as the reflux stream in alteration of the above described adsorption and desorption cycles of FIGS. 1 and 2.

As seen in FIGS. 3 and 4 the gross influent stream enters inlet port 128, and travels through passageway 130 into central passageway 66, whence it flows inwardly through the drilled holes into upper lesser spool diameter 58 where, as indicated by the arrows, this pressurized stream moves to and through outer gas passageways 134 up and into the open lower end of the external chamber 90, thence through the perforated plate 95, filter 96, and thence through the adsorbent material 98. From this bed of material in which the pressurized gas flow has given up a large portion of one or more of its constituents, the stream now passes through filter 96' and perforated plate 95', where as the primary effluent stream it enters passageway 108. The stream proceeds up inclined passageways 108 into recess 109 whence the pressure in the recess causes ball check 111 to compress spring 112 an amount sufficient for gas to enter and pass through passage 110, ball check chamber 115 and gas passage 116. From this passage the net primary effluent stream passes into collector passage 117, thence out through passage 125 and outlet ports 124 to the desired use or container.

At the same time that the primary stream passes into passage 110 the reflux or purging stream is forced under pressure from recess 109 through restrictive passage 118 where the gas expands and becomes cooled as described in connection with FIGS. 1 and 2 above. The expanded and cooled gas at the substantially reduced pressure passes into the recess 119 and open top of the internal chamber 92 where it purges the adsorbent material 104. After leaving the bed of material 104, the now saturated secondary stream enters the open lower portion of internal chamber 92, and enters and passes through passageway 132 and thence to collector passageway 67. From this collector passageway the secondary stream moves into the reduced spool diameter area 59 and passes upwardly thence out upper gas discharge passageway 136 or out relief passageway 75.

In the method of operation of the above described apparatus, it is to be noted that the adsorbent beds, while operating on the higher pressure adsorption cycle, are subject to a raise in temperature. These same beds while operating on the reduced or low pressure cycle are likewise subject to a decrease in temperature. When moisture is present in the gas stream, the possibility and probability of ice formation during the desorption cycle is quite prevalent unless steps are taken to offset the cooling effect of the desorption cycle. In particular, when the apparatus is to produce dry air and the key component to be removed from the gross influent stream is moisture, the formation of ice, if allowed to form and continue into the adsorption cycle, will result in operational malfunctioning of the apparatus. In our apparatus, as described above, the heat of adsorption is utilized whereby the wall 80 of our apparatus provides a heat transfer medium from the bed in the external chamber 90 to the bed in the internal chamber 92 so that this heat of adsorption can be used to balance and offset the cooling effect of gas expansion and the desorption cycle. In our invention we provide the method of heat transfer through the wall 80 to effect the transfer of the heat of adsorption with the cooling effect of the gas expansion and desorption.

Figures 12, 13, 14:
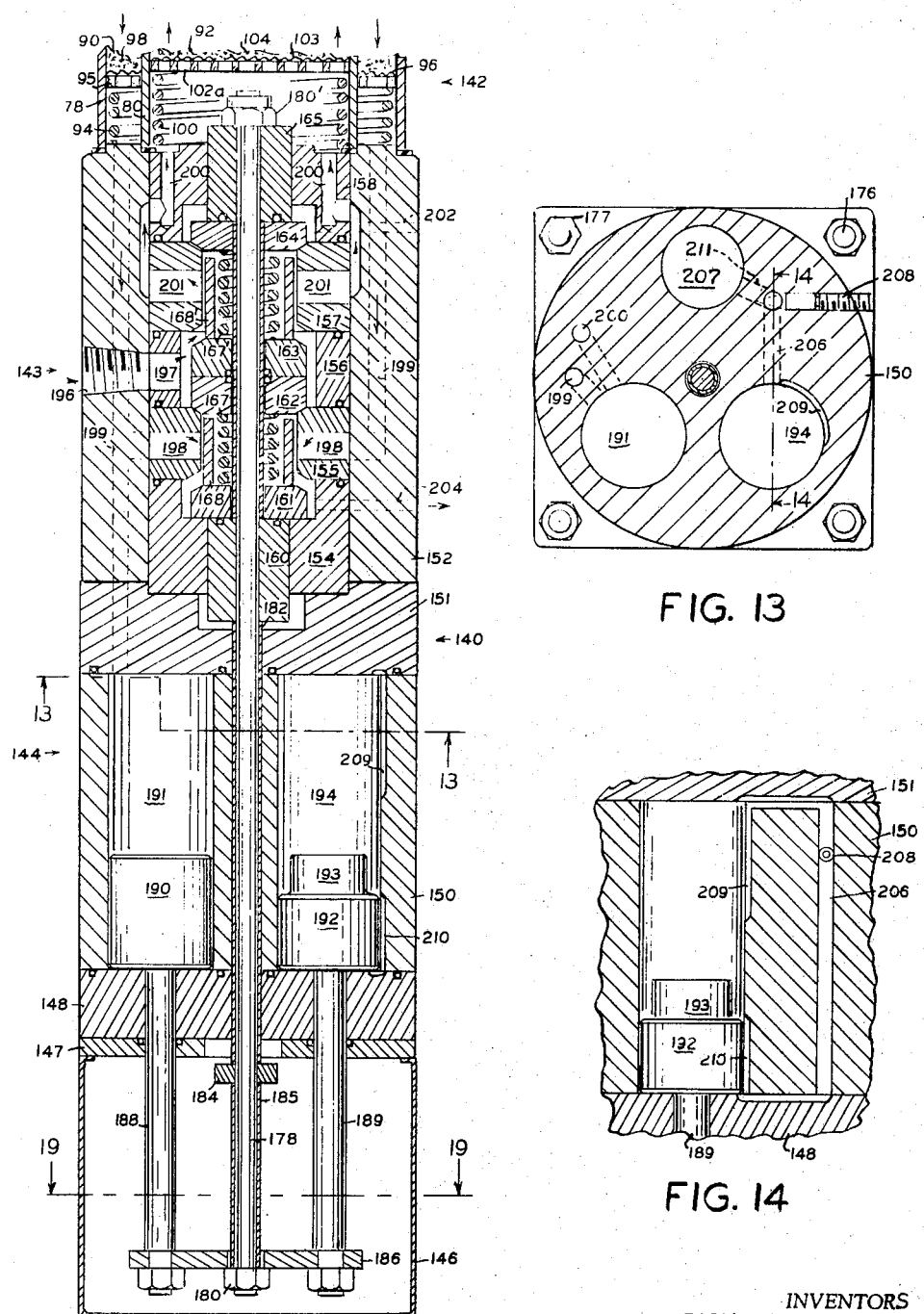
FIG. 12 is a view similar to FIG. 10 but with the pneumatic-hydraulic actuating and timing control and the flow control means at the other limit of operation.
FIG. 13 is a sectional view taken on the line 13—13 of FIG. 12.
FIG. 14 is a sectional view taken on the line 14—14 of FIG. 13.

In FIGS. 10–14 there is shown an embodiment of our invention which provides a novel spool valve construction and a means of actuating this valve. As seen in FIGS. 10–12, an assembly 140 having an output recovery section 141, an adsorbent section 142, a flow-switching section 143 and an actuating section 144 provides a unitary construction similar in size and shape to the assembly 20 of FIGS. 1–4 and described above. In this example, as reduced to practice, the actuating section 144 is provided with a cover 146 which may be of drawn sheet metal. This cover is fastened to an O-ring block 147 which is attached to and which supports base support block 148 which in turn supports or is in engagement with piston block 150. Immediately above block 150 is header block 151 which is the uppermost component of the actuating section 144.

In the flow-switching section 143 which is mounted immediately above actuating section 144, an outer passage block 152 serves as the outer housing member and in selectively formed passages therein carries the gas streams to the adsorbent section 142 above. This passage block 152 is of cylindrical cross-section, and in the through internal bore of this block are housed the fixed components comprising the port passageways of the spool valve assembly of this exemplification. These fixed components include a lower channel block 154 supporting a lower port ring 155 which in turn carries an intermediate spacer block 156. Immediately above block 156 and in full face contact therewith is an upper port ring 157 which in turn carries upper channel block 158.

Movable within the port passage components are the elements forming the novel spool assembly which as seen in FIGS. 10 and 12 include a lower rod bushing 160 slidable in lower channel block 154, a lower seat ring 161 having a sealing chamfer or face formed on its upper outer surface, an intermediate ring assembly having a downwardly facing and externally chamfered-edged seat ring 162 and an upwardly facing and externally chamfered-edged seat ring 163. Seat rings 162 and 163 are assembled and used in back-to-back relationship. A short distance above seat ring 163 is an upper seat ring 164 having on its lower outer surface a sealing chamfer or face. Carried by the intermediate upper surface of ring 164 is upper rod bushing 165. Between rings 161 and 162 there is placed a compression spring 167, and surrounding the major length of this spring but in an unconfined relationship thereto is a tubular spacer 168. Between rings 163 and 164 there is also a like compression spring 167' and spacer 168'.

Immediately above the flow-switching section is the adsorbent section 142 which, in all respects in the present instance, is composed of elements nearly identical to those used in the adsorbent section 22 of FIGS. 1–4. The adsorbent section is shouldered on the upper surface of passage block 152 and includes an outer wall 78 and inner wall 80, compression springs 94, 94', 100 and 100', perforated retaining plates 95, 95', 102a and 102a' (the 102a designating a perforated plate similar to 102 but with no central passage for stud 88), filters 96, 96', 103 and 103' and subdivided, adsorbent material or particles 98 and 104. Gaskets 84 and 85 seal the ends of external chamber 90 and internal chamber 92.

Immediately above the adsorbent section is the output recovery section in which the only change from the output recovery section 21 of FIGS. 1–4 is first, the bolting means for fastening together the output recovery section 141, adsorbent section 142 and flow-switching section 143; and second, the placement of restrictive passage 118 so as to be relocated in relation to recesses 109 and 119. In this switching section 143 the header block is designated as 170 and has therein addition to recesses 109 and 119 a restrictive passageway 172 connecting the two recesses, at least one gas passage 108, a gas passageway 110, a pair of ball checks 111, a pair of check springs 112, a pair of spring back-up screw plugs 114, two ball check chambers 115, and gas passages 116 and 123, each connecting to collector recess 117.

Immediately above header block 170 is a head plate designated 174 in which there is shown only a single passageway 125, and an outlet port 124. The bolting means for fastening together the three sections 141, 142 and 143 are four studs 176 with nuts 177 tightened on these studs to draw the components into gas-tight relationship.

ASSEMBLY AND OPERATION

A thrust rod 178 extends from nearly the bottom of cover 146 to the perforated plate 102a and by means of nuts 180 and 180' draws together in fixed relationship those intermediate members mounted thereon. Immediately below the upper nut 180' is upper rod bushing 165, then a tubular spacer 181 is mounted on rod 178 and serves to space at a predetermined fixed distance apart the upper bushing 165 and lower rod bushing 160. Immediately below lower bushing 160 is an intermediate tubular spacer 182 also mounted on rod 178, this spacer extending downwardly to a stop block 184. Below this stop black is a similarly shaped tubular spacer 185 also mounted on rod 178 and extending to the lower nut 180. By tightening upper and lower nuts 180 and 180', the rod bushings 160 and 165 and stop block 184 are positively located in assembled relationship to each other. As seen in FIGS. 10 and 19 there is immediately below stop block 184 a yoke 186 which is arranged to move without engaging tubular spacer 185 but will engage the under side of block 184 and upper or inner face of lower nut 180. Attached to this yoke and movable therewith are piston rods 188 and 189. Piston rod 188 is attached to and is moved by an air piston 190 slidable in cylinder bore 191, while piston rod 189 is attached to a piston having a major diameter portion 192 and an upper reduced diameter portion 193. As shown, the upper surfaces of piston 190 and piston portion 193 are in the same plane, while the lower surface of piston 190 and piston portion 192 are similarly in the same plane. The major diameter portion 192 is slidable in cylinder bore 194.

In operation the gross influent stream under pressure is fed into flow-switching section 143 through inlet port 196, thence through passageway 197 to the cylindrical recess between the sealing rings 162 and 163 and spacer block 156, and thence downwardly to the recess between spacer 168 and port ring 155. From this recess the stream flows through one or more passageways 198 and thence through one or more longitudinally disposed passageways 199 and into the lower open end of external chamber 90, thence through the adsorbent material 98 for the fractionation of the gross effluent stream of gas. The effluent stream energing from chamber 90 enters gas passage 108 and from there flows through recess 109 and then through ball check chamber 115, thence through passage 116, and recess 117, and is discharged as the primary effluent stream from outlet port 124. The purging or reflux stream flows under pressure through restrictive passageway 172 and into recess 119 where in an expanded and cooled condition it flows at a lower pressure into and through internal chamber 92 where it purges the bed of adsorbent material 104. Then, as described above, it enters one or more passageways 200 and a transverse passageway 201 in port ring 157 as a gross secondary effluent stream. From passageway 201 the secondary effluent stream enters the recess formed by port ring 157 and spacer 168 and from this recess passes through exhaust pasageway 202 to the atmosphere or is collected in a container (not shown) if the key component adsorbed by the bed is of commercial value or utility.

As seen in FIG. 12, passageway 199 not only extends upwardly, but also downwardly, to a point at the top of cylinder bore 191 where the gas enters and urges piston 190 downwardly. Shortly before the piston 190 reaches the lower limit of bore 191, the yoke 186 also moving with the piston engages nut 180 and moves thrust rod 178 downwardly, and all elements thereon are moved downwardly until the piston 190 reaches the lower limit imposed by the upper surface of support block 148. At this intsant the spool valve assembly has moved to the position shown in FIG. 12.

The flow of the gas in the flow-switching section is now reversed. The pressurized gross influent stream entering port 196 and pasasgeway 197 and the recess between seat rings 162 and 163 and the block 156 flows under pressure past ring 163 and into the recess between spacer 168 and upper port ring 157. From this recess the stream flows through transverse passageway 201 and thence through passageway 200 and into internal adsorbent chamber 92. This high pressure gross influent stream is passed over the adsorbent particles 104 where the key component is adsorbed, and from this chamber the gross effluent stream enters recess 119, passageway 120 and into the now pressure-forced open ball check chamber 115, thence through gas passage 123, collector recess 117, passageway 125 and out through outlet port 124 to a receptacle or apparatus, not shown. A portion of this gross effluent stream under pressure enters restrictive pasageway 172, and upon entering recess 109, expands and cools and then at a reduced pressure enters gas passage 108, and upon leaving this passage, enters the external chamber 90 where it purges the adsorbent material 98. The secondary gross effluent stream carrying the key component desorbed from the bed of chamber 90 leaves the bottom of chamber 90 and enters passageway 199, and flows thence to passageway 198 and the recess between rings 161 and 162. This low pressure effluent stream then flows out transverse lower exhaust passageway 204 to the atmosphere or to a receiving member, not shown.

As seen in FIG. 13, passageway 200 is continued longitudinally so as to connect to the lower point of piston bore 191. The pressurized gross influent stream entering port 196 and moving to the passageway 200 also has a portion of its pressurized supply carried to piston bore 191 by the downward extension of this passageway 200. This pressurized portion then enters the lower part of the bore 191 and urges piston 190 upwardly. Yoke 186, carried by piston rod 188, also moves upwardly at the same speed until it engages stop block 184, whence the yoke continues to move and carry block 184 and thrust rod 178 and all components mounted thereon upwardly to the position shown in FIG. 10 at which point the piston 190 stops having reached its upper limit as imposed by its top surface engaging the lower surface of header block 151.

It is to be noted that as the spool is shifted to either the upper or lower limit as exemplified in FIGS. 10 and 12 the pressurized gross stream of gaseous mixture as fed to cylinder bore 191 is shut off by the sealing action of seat ring 162 engaging lower port ring 155 or, if in the other position, of seat ring 163 engaging upper port ring 157. Correspondingly, as the pressure in passageways 199 and 200 is reduced, these passageways are opened to either exhaust passageway 202 or 204 thus allowing piston 191 to move as urged by the flow-controlled gross influent stream and with the nonthrust side of piston 190 vented to the atmosphere.

Another unique feature of the spool construction of FIG. 10 and FIG. 12 is the use of springs 167 and 167′ to approximately center the seating rings 162 and 163 which are slidably retained on upper tubular spacer 181. Spacers 168 and 168′ are used to assist in moving these seating rings. These rings as seen in FIG. 10 are urged into the sealing position shown by the lower spring 168 and by the pressure of the gross influent stream on the underside of seat ring 162. The mating angulated or chamfered surfaces providing sealing contact between seat ring 163 and upper port ring 157 thus prevents the passage of the gross influent stream into the recess between spacer 168′ and port ring 157. At the conclusion of an adsorption cycle and when upper seat ring 164 is moved downwardly, the upper spring 167′ is compressed, and as ring 164 continues to move downward if spring 167′ is not able to overcome the pressure exerted by the incoming gas against the undersurface of seat ring 162, the ring 164 will engage upper spacer 168′ and positively urge rings 162 and 163 downwardly, whence upper spring 167′ will overcome lower spring 167 and additionally urge the rings 162 and 163 downwardly towards the seating position of FIG. 12. As the ring 162 approaches lower port ring 155, the gross influent stream pressure on the top side of ring 163 will urge the chamfered sealing surfaces of elements 162 and 155 into a gas-sealing condition. This unique construction enables the various spool assembly components to be made and assembled with greater manufacturing tolerances thus encouraging economical mass production. This unique arrangement also enables economical repairs to be made. A further benefit of this assembly is the ability to use angulated face-sealing instead of the incomplete sealing provided by a sliding piston in a cylindrical bore. This is particularly important when the composition of the gas is such that the spool valve assembly requires that the components have special plating, heat treatment or be made of special materials not conducive to sliding operation.

Referring now particularly to FIGS. 10, 12, 13 and 14, there is shown a hydraulic timing control which provides means to adjust the cycle of operations and to also eliminate the requirement of electrical timing means often not acceptable when the gas being fractionated is highly flammable or one of the constituents thereof is flammable. As seen in FIGS. 13 and 14 the upper and lower portions of bore 194 are connected by a by-pass 206 having intermediate its length a needle 208 entering the by-pass and acting as an adjustable needle valve to control the rate of flow through the by-pass. The cylinder bore 194 and by-pass 206 in a sealed system are filled with a liquid such as a hydraulic brake fluid and as the piston 192–193 moves upward, the liquid is forced through the by-pass to the underside of the piston. The adjustment of needle 208 in by-pass 206 regulates the speed with which piston 192–193 is permitted to move. In the downward movement of this piston the hydraulic fluid will move from the bottom of the cylinder bore through the by-pass to the top of the cylinder bore. It is to be noted that in the reduction to practice of this embodiment it was found desirable to permit this piston to speed up at the upper and lower limits of its regulatory stroke, hence an upper relief 209 and a lower relief 210, each of predetermined length, are made in the wall of the cylinder bore 191.

In its operation as a timing means, piston 192–193 connected to yoke 186 by piston rod 189 is moved in response to the movement of air piston 190. Being restricted in its rate of travel by the rate of flow of the fluid through by-pass 206 and by adjusted needle 208, the piston 192–193 will travel at a selected rate of speed and in so doing will also permit piston 190 to travel at a like rate of speed. As it is desirable to switch the spool valve assembly speedily from the position of FIG. 10 to the position of FIG. 12, the relief portions 209 and 210 act as follows. Assuming that piston 192–193 is moving upwardly and is traveling at the speed selected by the adjustment of needle 208 and has reached the upward position where yoke 186 has just engaged stop block 184, the lower edge of piston portion 192 will have passed above the lower end of upper relief 209 whence by-pass 206 becomes ineffective and the hydraulic fluid in cylinder bore 194 is allowed to rush through relief 209 and to the underside of piston portion 192. Piston 190 now released from the restrictive movement of piston 192–193 will travel quickly to its upper limit. On the return stroke of piston 190 the restricted movement of piston 192–193 will again regulate the rate of travel until the upper edge of piston portion 192 passes the upper edge of lower relief 210, at which point yoke 186 will have just engaged lower nut 180. Simultaneously the hydraulic fluid will rush through lower relief 210, allowing piston 192–193 to quickly travel to its lower limit, and piston 190 again released from the restrictive movement of piston 192–193 will travel quickly to its lower limit, moving the spool assembly to the position of FIG. 12.

Referring now particularly to FIGS. 13 and 20 there is shown an expansion chamber 207 having a passageway 211 to bypass 206 whereby fluid in the chamber 194 may expand during the movement of the pistons 190 and 192 into chamber 207, which chamber contains therein a piston 217 in fluid tight sealing engagement through an O-ring 219 with the internal walls of the expansion chamber 207. The piston is supported and the fluid in the chamber 207 maintained under compressive pressure by coiled spring 215 one end of which rests within a bore of the piston 217 and the other end within a bore of a threaded set screw 212 having a center vent opening 221 in the slot to permit the entrance and discharge of air with the internal movement of the piston 217. In operation the hydraulic fluid is permitted to employ chamber 207 as an expansion or surge chamber during the movement of pistons 190 and 192 as hitherto described, with the fluid confined during expansion into the chamber or during discharge from the chamber under a preselected degree of compressive force from piston 217 and spring 215.

It is to be noted that the extended portion 193 of piston 192–193 is simply an expedient to simplify the making of piston block 150 and header block 151, and that modifications of the piston 192–193 and the upper and lower relief passages are possible so long as the piston travel of both pistons 190 and 192–193 are the same. It is also to be noted that unwanted gas flow between adjoining components and around the moving piston rods 188 and 189 and thrust rod 178 is prevented by the use of O-rings in either face or sliding contact.

Figure 9:
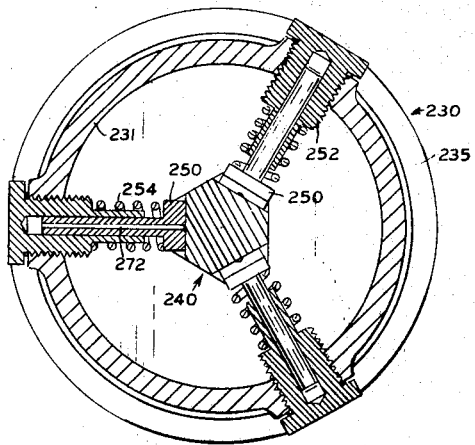
FIG. 9 is a sectional view taken on the line 9—9 of FIG. 8.

In FIGS. 7, 8 and 9 is shown another embodiment of our invention in which the flow-switching section of FIGS. 1–4 is attached to and actuated by a pneumatic-actuating section 226. This section provides also a means for timing the cycle of reciprocation of the spool 228 which is identical to spool 50 except for the threaded stud used for attachment to the actuating means. In all other respects the fractionating apparatus having an output recovery section 21, an adsorbent section 22 and the modified flow-switching section 24 as enumerated above both performs and is cycled as in FIGS. 1–4 described above. The activating section 26 is replaced in this embodiment by the pneumatic section 226. It is to be noted that the liner 60 as shown in FIGS. 7–8 is made of impregnated plastic which may be fiber-filled Teflon and with the spool also of this plastic furnishes operating possibilities for the handling of difficult or highly active gas combinations.

In this pneumatic section there is provided a housing 230 which may be a casting made with an upper half 231 and a lower half 232. Between these halves there is placed a diaphragm 234, and the two halves are then joined with the diaphragm securely and pneumatically sealed between by means of a clamp ring 235. Between housing 230 and housing block 48, there is tightly clamped a bleeder plate 236 which has a discharge passage 238 extending from a central recess to the atmosphere or outside of the plate 236. A hex shaft assembly 240 has an upper portion 241 with a female threaded rod portion 242 extending through and sliding in a cylinder bore in the upper half 231 of housing 230. Rod portion 242 is connected to a threaded extension 243 of spool 228 and is caused to move spool 228 in response to the movement of diaphragm 234. A lower hex shaft portion 245 is connected to upper portion 241 by means of piston rod 246 which has a reduced and threaded portion 247 extending through the diaphragm and clamping the diaphragm while engaging a threaded recess in upper portion 241. The piston rod 246 extends through and is slidable in a retaining bore in the lower half 231 of housing 230. On the shoulder formed by rod portion 242 and upper hex shaft portion 241 there is placed a rubber cushion 248, while on the like shoulder formed by rod 246 and lower hex shaft portion 245 there is also mounted a rubber cushion 249. These cushions act to prevent unwanted wear and shock as the hex shaft assembly is shifted to each limit of its motion.

Extending inwardly from the walls of housing 230 are two sets of detent assemblies, each set, as shown, having three equally spaced spring-urged detent assemblies, all lying in a common plane. Each detent assembly includes a headed plunger 250 and a threaded guide body 252 screwed into a threaded opening in the wall of housing 230 and having a closed bore carrying in slidable relationship the cylindrical portion of plunger 250. A compression spring 254 is seated on body 252 and extends inwardly so as to engage the head of plunger 250 and urge the plunger inwardly. The head of the plunger 250 is shaped so as to engage a notch or detent seat 256 formed in one longitudinal face of the hex shaft assembly 240.

In operation and as seen in FIG. 7 the gross primary influent stream enters port 128 and thence the recess around spool lesser diameter 57, and next flows into gas passageway 134 as described above. The lateral portion of passageway 134 has been extended and a tube 258 is attached thereto and carries a portion of this pressurized stream to inlet port 259 in the upper housing 231. From this port 259 a restrictive passageway 260 leads to the chamber formed by the upper half 231 of the housing 230 and diaphragm 234. The pressurized stream metered by passageway 260 flows in a small but continuous amount into this upper chamber until the pressure in the chamber approaches or reaches the pressure of the gross influent stream, whence the diaphragm 234 is caused to snap or move to the position shown in FIG. 8, thereby moving the spool 228 to a position so as to cause the gross influent stream of gaseous mixture material to flow into the recess of reduced spool diameter 57 whence it flows into gas passageway 132. A lateral extension of this gas passageway extends to the outer surface of housing 48 where tube 262 receives the gross influent stream and carries a portion of it to lower inlet port 263 in lower housing 232. From this port a restrictive passageway 264 leads to the chamber formed by the diaphragm 234 and the lower half 232 of housing 230. A pressurized stream carried by tube 262 and metered by passageway 264 flows in a small but continuous amount into this lower chamber until the pressure in the chamber approaches or reaches the pressure of the gross influent stream, whence the diaphragm is caused to snap to the position shown in FIG. 7.

The set of three spring-loaded plungers 250 retain or assist in retaining the hex shaft assembly 240 in either the predetermined upper or lower position until the pressure in either the upper or lower chamber as described above causes the hex shaft assembly 240 and spool 228 to move to the other position, whence the other set of plungers 250 will engage the other group of notches 256.

It is essential that as either the upper or lower chamber is pressurized by the gross influent stream the other chamber is depressurized so that diaphragm 234 will be responsive to the incoming pressurized influent stream. There is therefore provided means for exhausting each chamber only while the other chamber is being pressurized.

Referring to FIG. 7, piston rod 246 has a groove 266 formed thereon and arranged so as to be within the lower chamber when diaphragm 234 is in the position shown. A passageway from groove 266 to inner drilled relief 267 is formed in the end of piston rod 246 and provides a means for the expelling to the atmosphere of the pressurized stream in the lower chamber.

Referring now to FIG. 8, rod portion 242 has a groove 268 formed therein and arranged so as to be within the upper chamber when diaphragm 234 is in the position shown. A drilled passageway from groove 268 extends inwardly to the threaded passageway 269. A short distance above groove 268 another drilled passageway 270 in rod portion 242 extends from passageway 269 to recess 271. The pressurized gross influent stream in the upper chamber is able to flow from groove 268 through threaded passageway 269, drilled passageway 270 and recess 271, and thence through discharge passage 238 to the atmosphere.

In FIG. 9 it is to be noted that the plungers 250 are arranged one hundred and twenty degress apart, and as reduced to practice, this arrangement has provided a satisfactory means of equalizing the pressure of springs 254 so as not to unduly wear the guideways or bores carrying rod portion 242 and piston rod 246. Other arrangements of plungers, such as groupings to two, four or more in a single plane and equally spaced, could also be selected.

It is to be noted that each plunger 250 has a longitudinally drilled hole 272 extending through it so that gas trapped in the blind end of the bore in guide body 252 may be readily expelled and permit the plunger to move freely in response to the urging of spring 254.

Figure 15:
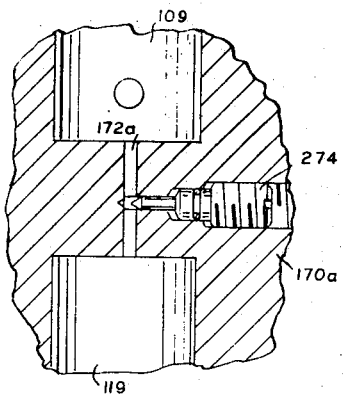
FIG. 15 is a sectional fragmentary view showing an alternate restrictive passage construction as used in the apparatus of FIG. 11.

In FIG. 15 is shown an alternate means of construction of the restrictive passage 172 of FIG. 11 in which the passage 172a has intermediate the recess 109 and recess 119 a needle 274 threadedly mounted in header block 170a with the inner end of needle 274 entering passage 172a so as to adjustably control the flow of the purge or reflux stream therethrough.

Figure 16:
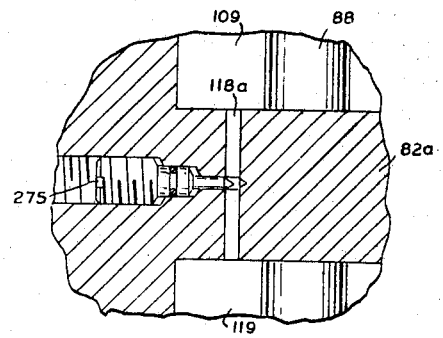
FIG. 16 is a sectional fragmentary view showing an alternate restrictive passage construction as used in the apparatus of FIGS. 2 and 4.

In FIG. 16 is shown an alternate means of construction of the restrictive passage 118 of FIGS. 1 and 3 in which a passage 118a has intermediate the recess 109 and recess 119 a needle 275 threadedly mounted in header block 82a with the inner end of the needle entering passage 118a so as to adjustably control the flow of the purge or reflux stream therethrough.

Figure 17:
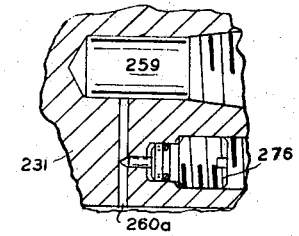
FIG. 17 is a fragmentary sectional view of an alternate upper restrictive passageway as used in the apparatus of FIGS. 7 and 8.
Figure 18:
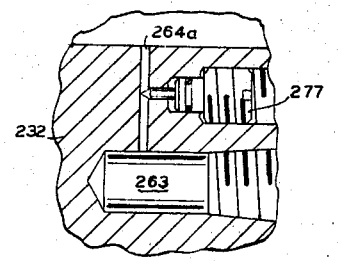
FIG. 18 is a fragmentary sectional view of an alternate lower restrictive passageway as used in the apparatus of FIGS. 7 and 8.

In FIG. 17 is shown an alternate means of construction of the restrictive passage 264 of FIGS. 7 and 8 in which a passage 264a has intermediate the inlet port 263 and the lower chamber a needle 277 threadedly mounted in lower housing so that the inner end of the needle will be adjustably movable so as to provide for the adjustable control of the flow of the backwashing or purge stream therethrough.

While the actuating sections as exemplified in the pneumatic arrangement of FIGS. 7, 8, and 9 and in the pneumatic-hydraulic arrangement of FIGS. 10, 11, 12, 13, 14 and 19 have been shown in connection with the gas fractionating apparatus connected thereto and more fully described in relation to FIGS. 1–4, it is to be understood that the improvements as shown in the two embodiments are applicable not only to "heatless" dryers but may be used in conjunction with dryers using heaters and coolers in their beds.

While the invention has been described in detail with respect to preferred embodiments, it will be understood by those skilled in the art that various modifications may be made without departing from the spirit and scope of the invention, and it is intended to cover all such changes and modifications in the appended claims.

We claim as our invention:

1. A gaseous fractionating apparatus which comprises: (1) a first and second adsorption zone, each having a one end and another end, and containing subdivided adsorbent particles, which zones are in a heat exchange relationship to each other; (2) a single valve means to permit the alternating introduction into the one end of each zone of a relatively high pressure gaseous stream containing at least one key component for which the adsorbent has a selective adsorptive affinity and the discharge of a relatively low pressure secondary gaseous effluent stream from the other zone; (3) a pneumatic timing means to activate and move the valve means in a predetermined timed sequence; (4) conduit means including valve means to provide for the withdrawal at the other end of the zones of a relatively high pressure, net effluent primary stream containing the key component in a reduced concentration; and (5) means to permit the expansion from the high pressure zone to the low pressure zone of a gas reflux system from the gross primary effluent stream.

2. Apparatus according to claim 1 in which the pneumatic timing means for moving the valve includes: (1) a pressure-tight housing having an upper and lower chamber; (2) a pressure-responsive diaphragm disposed between the chambers and providing a common movable pressure-tight wall between said chambers; (3) means to feed a portion of the high pressure gaseous stream to one of the chambers to move the diaphragm to one limit of its operation; (4) means responsive to the movement of the diaphragm to move the valve means to one limit of its actuating position; (5) means responsive to the position of the valve means to urge the diaphragm to the other limit of operation; and (6) means responsive to the movement of the diaphragm to move the valve means to its other limit of its actuating position.

3. Apparatus according to claim 2 in which the valve means includes a spool and the timing means for moving the valve spool includes: (1) a hex shaft assembly attached to the diaphragm and spool and movable with the diaphragm to move the spool; (2) means to releasably restrain the hex shaft assembly at its limits of movement; (3) means to deliver at a predetermined rate and to one of the chambers a portion of the high pressure gaseous stream; and (4) means for the passage to the atmosphere of the gas in the other chamber not receiving the high pressure gaseous stream, whereby when the pressure in the chamber being fed the high pressure gaseous stream approaches the pressure of the high pressure stream, the thus exerted force on the diaphragm overcomes the releasable restraining means causing the diaphragm to move and with it to move the hex shaft assembly and spool to the other limit of operation whereby the depressurized chamber starts to become pressurized and the prior pressurized chamber to become depressurized.

4. Apparatus according to claim 3 in which the releasably restraining means includes: (1) selectively spaced notches in the hex shaft assembly; (2) a guided plunger adapted to seat in each notch; and (3) a spring means urging each guided plunger into engagement with the correspondingly disposed notch, said notches and plunger being selectively spaced so as to locate the valve assembly at its upper and lower limit of operational movement and so spaced that as the plungers at one limit of operation engage the notch the plungers at the other limit are disengaged from their notch.

5. Apparatus according to claim 3 in which the means to deliver the portion of high pressure gaseous stream to the chamber includes a restrictive passage and an adjustable flow control in said passage for regulating the rate of flow of the gaseous high pressure stream being fed to the chamber.

6. A gaseous fractionating apparatus which comprises: (1) a first and second adsorption zone, each having a one end and another end, and containing subdivided adsorbent particles, which zones are in a heat exchange relationship to each other; (2) a single valve means to permit the alternating introduction into the one end of each zone of a relatively high pressure gaseous stream containing at least one key component for which the adsorbent has a selective adsorptive affinity and the discharge of a relatively low pressure secondary gaseous effluent stream from the other zone; (3) a pneumatic activating means and a hydraulic timing means to move the valve means in a predetermined timed sequence to produce adsorption and description cycles of predetermined lengths of time; (4) conduit means including valve means to provide for the withdrawal at the other end of the zones of a relatively high pressure, net effluent primary stream containing the key component in a reduced concentration; and (5) means to permit the expansion from the high pressure zone to the low pressure zone of a gas reflux system from the gross primary effluent stream.

7. An activating and timing control for automatically cycling a single valve control means for directing an inflow stream of high pressure gaseous material and the like to one of two outlet passageways, the activating and timing control comprising:
(a) a pressure-tight housing having an upper and lower chamber;
(b) a pressure-responsive diaphragm disposed between the chambers and providing a common movable pressure-tight wall between said chambers;
(c) means to feed and to deliver at a predetermined rate to one of said chambers from one outlet passageway a portion of the high pressure stream to move the diaphragm to one limit of its operation;
(d) means responsive to the movement of the diaphragm to move the control to one limit of its actuating position which means includes, a hex shaft assembly attached to the diaphragm and having means for connection to the valve control, said hex shaft and means for connection movable with the diaphragm to move the valve control;
(e) means to releasably restrain the hex shaft assembly at its limits of movement;
(f) means responsive to the position of the valve control to urge the diaphragm to the other limit of operation;
(g) means responsive to the movements of the diaphragm to move the valve control to the other limit of its actuating position;
(h) means for the passage to the atmosphere of the gas in the other chamber not receiving the high-pressure stream whereby when the pressure in the chamber being fed the high-pressure stream approaches the pressure of the high-pressure stream, the thus exhibited force on the diaphragm to move and with it to move the hex shaft assembly and valve connecting means to the other limit of operation whereby the depressurized chamber starts to become pressurized and the prior pressurized chamber to become depressurized.

8. Apparatus according to claim 7 in which the releasably restraining means includes: (1) selectively spaced notches in the hex shaft assembly; (2) a guided plunger adapted to seat in each notch; and (3) a spring means urging each guided plunger into engagement with the correspondingly disposed notch, said notches and plunger being selectively spaced so as to locate the valve assembly at its upper and lower limit of operational movement and so spaced that as the plungers at one limit of operation engage the notch the plungers at the other limit are disengaged from their notch.

9. Apparatus according to claim 7 in which the means to deliver the portion of high pressure stream to the chamber includes a restrictive passage and an adjustable flow control in said passage for regulating the rate of flow of the high pressure stream being fed to the chamber.

References Cited
UNITED STATES PATENTS

| | | | |
|---|---|---|---|
| 772,115 | 10/1904 | Thompson | 251—54 |
| 3,160,486 | 12/1964 | Busch | 55—271 X |
| 3,324,631 | 6/1967 | Kreuter | 55—163 |
| 3,332,215 | 7/1967 | Revell | 55—272 X |
| 3,367,367 | 2/1968 | Moriyama et al. | 251—54 X |

REUBEN FRIEDMAN, Primary Examiner

JOHN W. ADEE, Assistant Examiner

U. S. Cl. X.R.

55—163; 137—625.69; 251—54